United States Patent
Bridges et al.

(10) Patent No.: US 7,178,987 B2
(45) Date of Patent: Feb. 20, 2007

(54) PRELOADED DUPLEX BALL BEARING DESIGN

(75) Inventors: Eric B. Bridges, Tempe, AZ (US); Raymond J. Knorr, Tempe, AZ (US); Scott J. Marshall, Phoenix, AZ (US); Edward (Edd) M. Brady, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 125 days.

(21) Appl. No.: 11/034,028

(22) Filed: Jan. 11, 2005

(65) Prior Publication Data

US 2006/0153483 A1    Jul. 13, 2006

(51) Int. Cl.
  *F16C 33/66* (2006.01)
(52) U.S. Cl. ...................... 384/475; 384/465
(58) Field of Classification Search ............... 384/465, 384/473–475; 415/111, 112; 416/174; 210/787; 184/6.24
  See application file for complete search history.

(56) References Cited

U.S. PATENT DOCUMENTS

| | | | |
|---|---|---|---|
| 2,911,267 A * | 11/1959 | Small, Jr. ................... | 384/465 |
| 4,183,591 A | 1/1980 | Mayer | |
| 4,334,720 A * | 6/1982 | Signer ....................... | 384/475 |
| 4,927,326 A | 5/1990 | von Pragenau | |
| 5,121,999 A | 6/1992 | Johnson et al. | |
| 5,183,342 A * | 2/1993 | Daiber et al. ............... | 384/475 |
| 5,316,393 A | 5/1994 | Daugherty | |
| 5,967,762 A | 10/1999 | Keller et al. | |
| 6,048,101 A | 4/2000 | Rasmussen | |
| 6,135,641 A | 10/2000 | Smith | |
| 6,158,894 A | 12/2000 | Pujari et al. | |
| 6,179,933 B1 | 1/2001 | Dodd et al. | |
| 6,409,390 B1 | 6/2002 | Bouzakis et al. | |
| 6,409,464 B1 | 6/2002 | Fisher et al. | |
| 6,478,553 B1 | 11/2002 | Panos et al. | |
| 6,511,228 B2 | 1/2003 | Dusza | |
| 6,651,633 B1 | 11/2003 | Jones | |
| 2004/0190806 A1 | 9/2004 | Lauck et al. | |

FOREIGN PATENT DOCUMENTS

| | | |
|---|---|---|
| DE | 9002218 U1 | 4/1990 |
| FR | 2688574 A1 | 9/1993 |
| WO | WO 2005/065833 | 7/2005 |
| WO | PCT/US2006/00249 | 6/2006 |

* cited by examiner

Primary Examiner—Thomas R. Hannon
(74) Attorney, Agent, or Firm—Ingrassia Fisher & Lorenz (57) ABSTRACT

A bearing assembly comprising a centrifugal debris trap for removing contamination debris from lubrication fluid prior to lubrication of the bearing assembly components is provided. The centrifugal debris trap comprises an annular groove on an inner race such that with sufficient centrifugal force, contamination debris in the lubrication oil is forced into the groove and held there. Removal of contamination debris from the lubrication oil prevents damage to bearing balls and races of the bearing assembly, thus reducing bearing fatigue. A method for lubricating bearing assembly components using the bearing assembly of the present invention is also provided.

60 Claims, 10 Drawing Sheets

PRELOADED DUPLEX BALL BEARING DESIGN

BACKGROUND OF THE INVENTION

The present invention relates in general to preloaded duplex ball bearings and in particular, to preloaded duplex ball bearings having a centrifugal debris trap.

Hard-preloaded duplex ball bearings of the type used to support high speed gas turbine engine main rotors are more vulnerable to failure than common single row thrust bearings. One reason is that hard-preloaded duplex ball bearings are more sensitive to contamination particles in lubricating oil. Small particles trapped between the rolling contact surfaces are pressed into the raceway with greater force than a single ball bearing produces, resulting in debris damage leading to premature rolling contact fatigue failure. The bearings also have an increased sensitivity to thermal gradients that can cause either an increase or decrease in operating thrust preload. These are the two factors responsible for the majority of failures of this type of bearing. The commonly used hard-preloaded duplex bearing is particularly sensitive to these factors due to the high axial stiffness inherent in the hard-preloaded configuration. Despite increased risk of failure, preloaded duplex ball bearings are utilized in applications where the axial thrust load may approach zero, or reverse.

U.S. Pat. No. 5,316,393 describes a preloaded duplex ball bearing having two springs for preloading. The spring preload is used to allow thrust load reversals and to prevent skid damage and provide robustness to thermal gradients. The preloaded duplex ball bearing does not, however, provide a means for preventing damage from contamination particles found in lubricating oil.

U.S. Pat. No. 6,179,933 describes a method of treating rolling element bearings for improved wear resistance. The raceway surfaces of the rolling element bearing are subjected to plasma nitriding to increase the hardness of the bearing components and to introduce compressive residual stress. The increased surface hardness and compressive residual stress gives improved resistance to debris damage and increases rolling contact fatigue life. While plasma nitriding the rolling element bearing helps against debris damage, it does not remove the contamination particles found in lubricating oil and with time, the hardened bearing will eventually fail.

As can be seen, there is a need for a preloaded duplex ball bearing that is less sensitive to thermal gradients as well as being able to withstand and even eliminate, contamination particles found in lubricating oil.

SUMMARY OF THE INVENTION

In one aspect of the invention, there is provided an inner race of a ball bearing assembly wherein the inner race comprises an inner surface and an outer surface; a centrifugal debris trap wherein the centrifugal debris trap comprises an annular groove on the inner surface; at least one circumferential groove on the inner surface wherein the circumferential groove is in fluid communication with the centrifugal debris trap; and radial oil holes fluidly communicating the inner surface and the outer surface.

In another aspect of the invention, there is provided a bearing assembly comprising a bearing cage; a plurality of bearing balls wherein the bearing balls are circumferentially spaced apart from each other by the bearing cage; inner and outer races, wherein the bearing cage is disposed between the inner and outer races and wherein the inner race comprises a first inner surface and a first outer surface and the outer race comprises a second inner surface and a second outer surface; a centrifugal debris trap wherein the centrifugal debris trap comprises an annular groove on the first inner surface of the inner race; at least one circumferential groove on the first inner surface of the inner race wherein the circumferential groove is in fluid communication with the centrifugal debris trap; and radial oil holes in the inner race fluidly communicating the circumferential grooves with the bearing balls.

In a further aspect of the invention, there is provided a duplex bearing assembly comprising a forward bearing cage; a plurality of forward bearing balls wherein the forward bearing balls are circumferentially spaced apart from each other by the forward bearing cage; an aft bearing cage; a plurality of aft bearing balls wherein the aft bearing balls are circumferentially spaced apart from each other by the aft bearing cage; an inner race wherein the inner race comprises a first inner surface and a first outer surface; a forward outer race and an aft outer race, wherein the forward outer race comprises a second inner surface and a second outer surface and wherein the aft outer race comprises a third inner surface and a third outer surface; wherein the forward bearing cage is disposed between the inner race and the forward outer race and wherein the aft bearing cage is disposed between the inner race and the aft outer race; a centrifugal debris trap wherein the centrifugal debris trap comprises an annular groove on the first inner surface of the inner race; at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap; and radial oil holes in the inner race fluidly communicating the circumferential grooves with the forward bearing balls and the aft bearing balls.

In yet another aspect of the invention, there is provided a preloaded duplex bearing assembly comprising a forward bearing cage; a plurality of ceramic forward bearing balls wherein the forward bearing balls are circumferentially spaced apart from each other by the forward bearing cage; an aft bearing cage; a plurality of ceramic aft bearing balls wherein the aft bearing balls are circumferentially spaced apart from each other by the aft bearing cage; an inner race wherein the inner race comprises a first inner surface and a first outer surface and wherein the inner race further comprises a forward inner raceway and an aft inner raceway on the first outer surface, the first inner raceway and the second inner raceway further comprising a hardened surface; a forward outer race and an aft outer race, wherein the forward outer race comprises a second inner surface and a second outer surface, the second inner surface further comprising a forward outer raceway and wherein the aft outer race comprises a third inner surface and a third outer surface, the third inner surface further comprising an aft outer raceway, the forward outer raceway and the aft outer raceway further comprising a hardened surface; wherein the inner race and the forward outer race are concentric and wherein the forward bearing cage is disposed concentrically between the inner race and the forward outer race at the forward inner raceway and the forward outer raceway; wherein the inner race and the aft outer race are concentric and wherein the aft bearing cage is disposed concentrically between the inner race and the aft outer race at the aft inner raceway and aft outer raceway; a centrifugal debris trap wherein the centrifugal debris trap comprises an annular groove on the first inner surface of the inner race; at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap; radial oil holes in the inner race fluidly communicating at least one of the circumferential grooves with the forward bearing balls and at least another of the circumferential grooves with the aft bearing balls; and a preload spring disposed on the third outer surface of the aft outer race.

In another aspect of the invention, there is provided a turbine engine comprising a main shaft; an bearing carrier; and a duplex bearing assembly comprising a forward bearing cage, a plurality of forward bearing balls wherein the forward bearing balls are circumferentially spaced apart from each other by the forward bearing cage, an aft bearing cage, a plurality of aft bearing balls wherein the aft bearing balls are circumferentially spaced apart from each other by the aft bearing cage, an inner race wherein the inner race comprises a first inner surface and a first outer surface, a forward outer race and an aft outer race, wherein the forward outer race comprises a second inner surface and a second outer surface and wherein the aft outer race comprises a third inner surface and a third outer surface, wherein the forward bearing cage is disposed between the inner race and the forward outer race and wherein the aft bearing cage is disposed between the inner race and the aft outer race, a centrifugal debris trap wherein the centrifugal debris trap comprises an annular groove on the first inner surface of the inner race, at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap, and radial oil holes in the inner race fluidly communicating at least one of the circumferential grooves with the forward bearing balls and at least another of the circumferential grooves with the aft bearing balls; and wherein the duplex bearing assembly is connected to the main shaft at the first inner surface of the inner race and wherein the duplex bearing assembly is connected to the bearing carrier at the second and third outer surfaces of the forward and aft outer races.

In a further aspect of the present invention, there is provided a method of lubricating a bearing assembly comprising the steps of delivering lubrication fluid to a centrifugal debris trap through radial oil supply holes in a main shaft; trapping contamination debris in the lubrication fluid in the centrifugal debris trap using centrifugal force, wherein the centrifugal debris trap comprises an annular groove on a first inner surface of an inner race; distributing the lubrication fluid to a plurality of bearing balls through axial slots to circumferential grooves and then to radial oil holes, wherein the circumferential grooves are annular grooves on the first inner surface of the inner race and the radial oil holes are in the inner race; and lubricating the bearing balls with the lubrication fluid.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a bearing assembly having a centrifugal debris trap for removing debris from a lubrication fluid and a method of lubricating a bearing assembly using the centrifugal debris trap. The bearing assembly may comprise a bearing cage and a plurality of bearing balls circumferentially spaced apart from each other by the bearing cage. The bearing assembly may further comprise concentric inner and outer races wherein the bearing cage is disposed concentrically between the inner and outer races. The inner race may be mounted onto an engine shaft and the outer race may be mounted into a bearing carrier. The bearing inner race may be mounted to the shaft with an interference fit. The bearing assembly may further comprise a centrifugal debris trap. The centrifugal debris trap may be an annular groove on an inner surface of the inner race that may be connected to an outer face of the inner groove and the bearing balls by radial oil holes in the inner race and axial slots in the inner race, or, preferably on the shaft outer surface. The bearing assembly of the present invention may be used in high-speed turbo machinery such as, but not limited to, high-speed gas turbine engines, machine tool spindles, turbo-pumps, and gas compressors.

In the present invention, the centrifugal debris trap of the bearing assembly may prevent damage to the bearing balls and to raceways of both the inner and outer races due to debris contamination in lubrication fluid by capturing debris in lube passages. Lubrication fluid used in high-speed applications normally comprises some solid contamination debris. In particular, new engines, or recently serviced engines, generally have some manufacturing and/or environmental debris trapped in the lubrication passages and machined parts. If this debris is allowed to reach the bearing balls and the inner and outer raceways of the inner and outer races, as can happen if the contamination debris is downstream of the oil filter, the contamination debris may become trapped between rolling contact surfaces and may damage the raceways and or the rolling elements, shortening the useful life of the bearing assembly. According to the present invention, as the bearing rotates at high speed, lubrication fluid entering the centrifugal trap may be subjected to g-forces great enough to force contamination debris to collect in the annular groove of the centrifugal debris trap. The lubrication fluid, after the removal of the contamination debris, may then flow from the centrifugal debris trap to the bearing balls and inner and outer raceways of the inner and outer races via axial slots in the shaft or inner race, and radial oil holes in the inner race, lubricating the bearing assembly. While the prior art uses centrifugal force to distribute lubrication fluid to bearing assembly elements, it does not use or suggest a centrifugal debris trap for removing contamination debris from a lubricating fluid.

Figure 1:
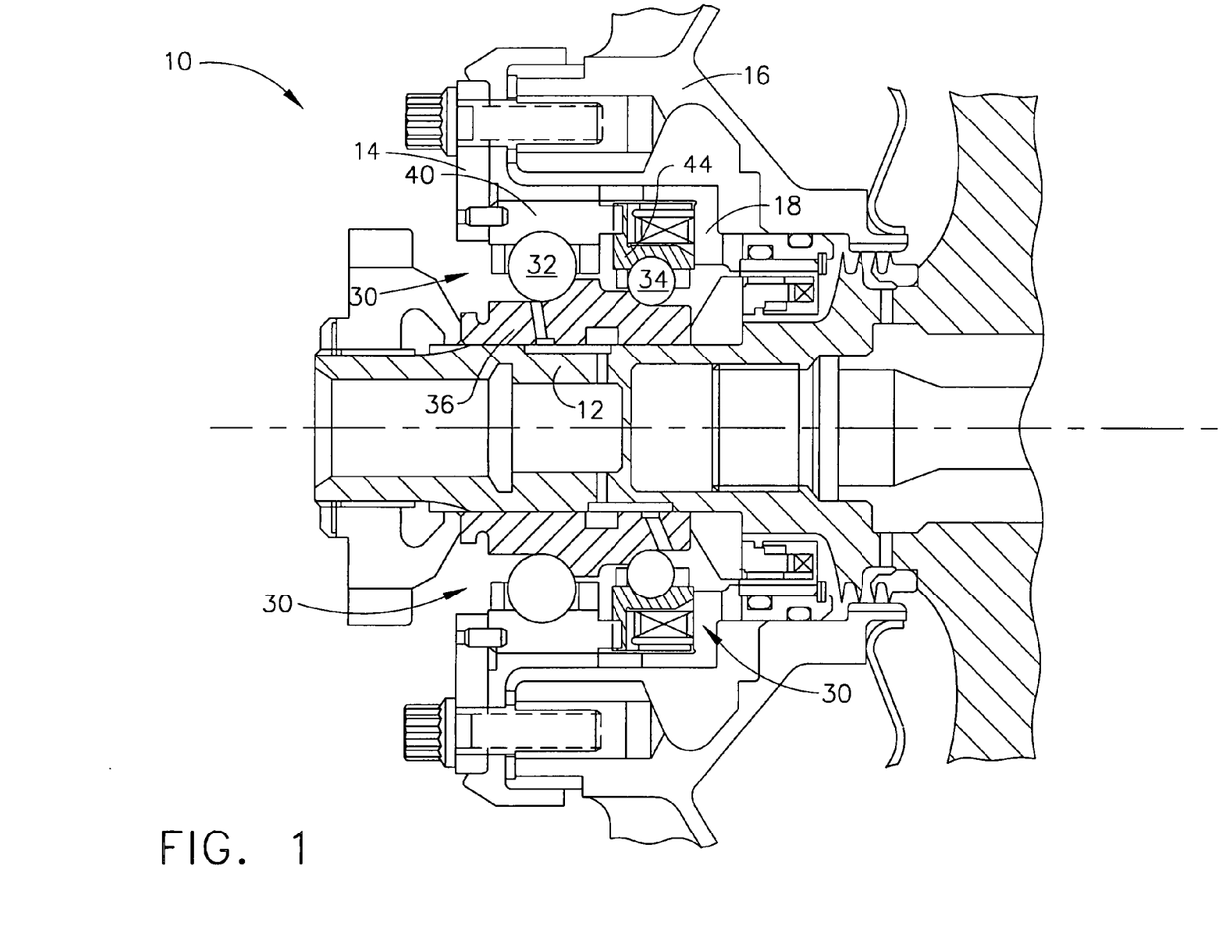
FIG. 1 shows a cross-sectional view of a bearing sump of a turbine engine, according to the invention.

Illustrated in FIG. 1 is a bearing sump 10 of a turbine engine that may include a main shaft 12, a duplex bearing assembly 30, a bearing housing 16, a thrust retainer 14 and a bearing carrier 18. Duplex bearing assembly 30 may further comprise inner race 36, forward outer race 40, aft outer race 44, and forward and aft ball bearings, 32 and 34, respectively. Thrust retainer 14 axially retains duplex bearing assembly 30 as well as transmitting the axial thrust from forward and aft bearings, 32, 34. Forward outer race 40 and aft outer race 44 may be secured to a fixed structure such as, but not limited to, bearing carrier 18 which in turn, is attached to bearing housing 16. During operation of bearing sump 10, radial bearing loads are transmitted from the bearings through bearing carrier 18. Inner race 36 may be integral with, or otherwise fixedly connected with, main shaft 12 with an interference.

Figure 2:
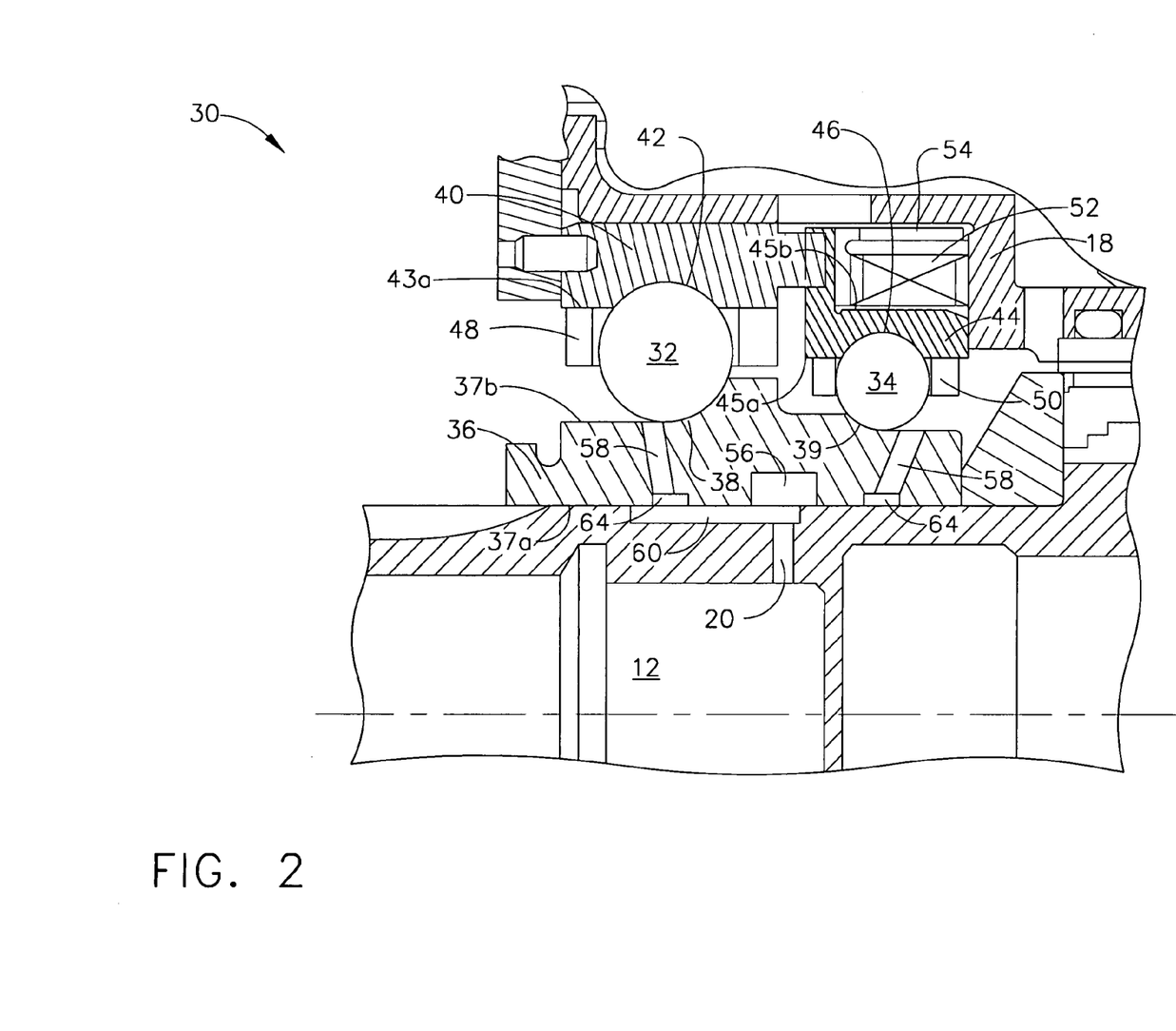
FIG. 2 shows a cross-sectional view of a preloaded duplex ball bearing, according to one embodiment of the present invention.
Figure 3A:
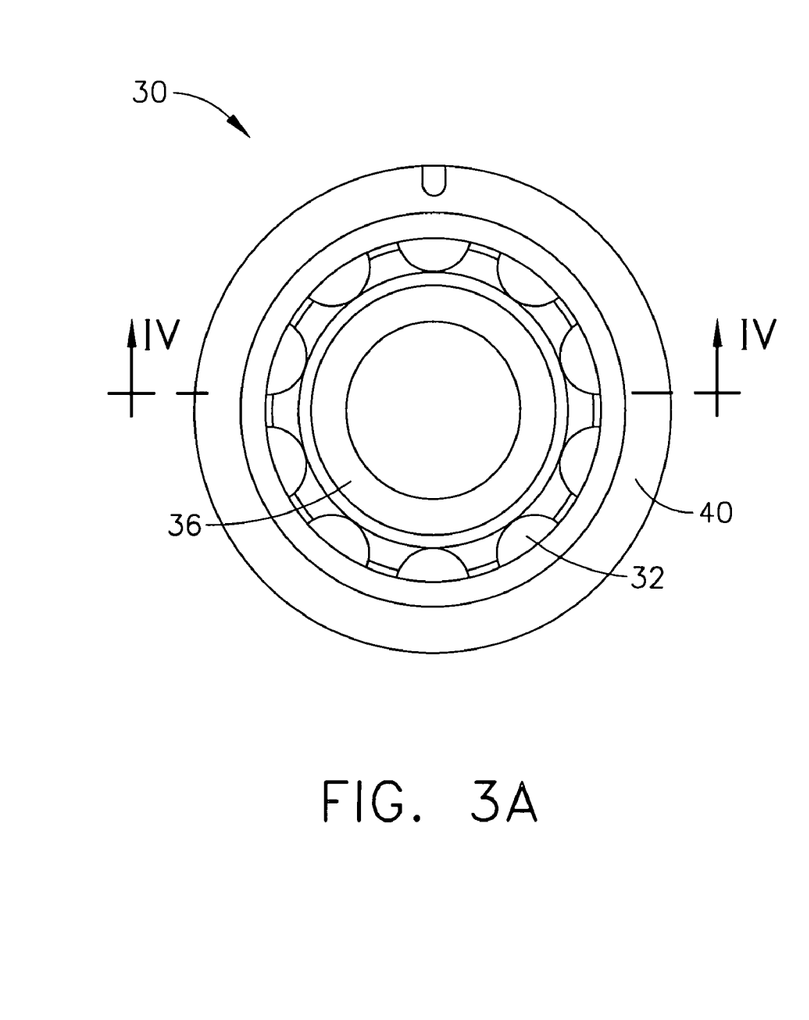
FIG. 3A shows a front view of a duplex bearing assembly, according to the invention.
Figure 3B:
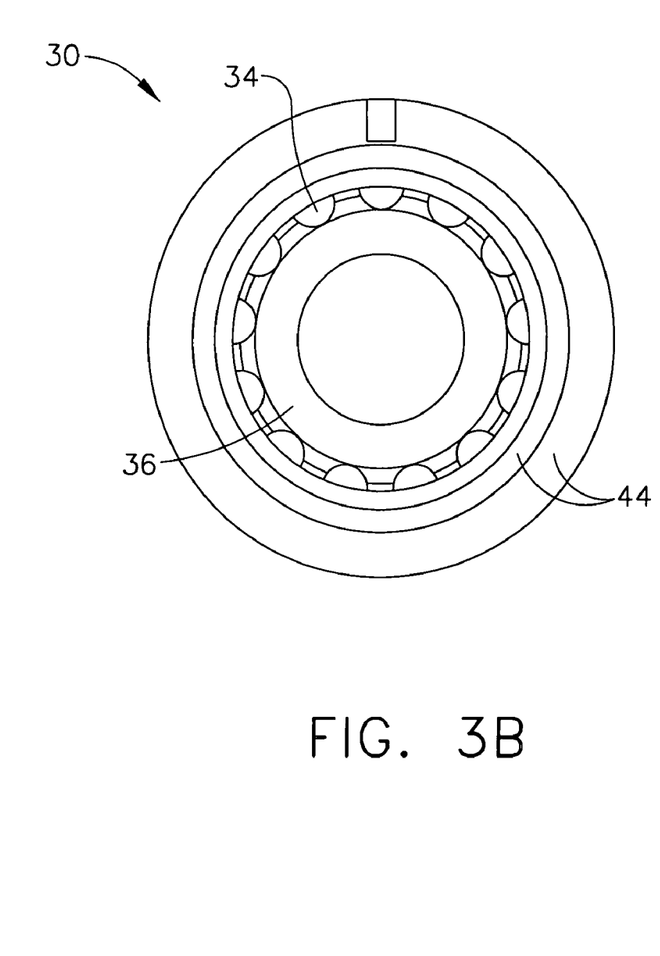
FIG. 3B shows a back view of the duplex bearing assembly of FIG. 3A, according to the invention.

Duplex bearing assembly 30 is illustrated in more detail in FIG. 2. Duplex bearing assembly may comprise forward bearing cage 48, forward bearing ball 32, aft bearing cage 50 and aft bearing ball 34. Forward bearing cage 48 and aft bearing cage 50 may be circular rings comprising cage pockets for retaining individual forward bearing balls 32 and aft bearing balls 34, respectively. A plurality of forward bearing balls 32 may be retained between inner race 36 and forward outer race 40 as illustrated in FIG. 3A. Alternatively, a plurality of aft bearing balls 34 may be retained between inner race 36 and aft outer race 44 as illustrated in FIG. 3B. The number of either forward 32 or aft 34 bearing balls may depend on the circumference of the balls and/or the dimensions of the bearing assembly 30.

Inner race 36 may also comprise a first inner surface 37a and a first outer surface 37b. First inner surface 37a may be connected to shaft 12 while first outer surface 37b may be facing forward bearing balls 32 and aft bearing balls 34. First outer surface 37b may further comprise forward inner raceway 38 and aft inner raceway 39. In contrast to single inner race 36 with two raceways, there may be two distinct outer races, namely, forward outer race 40 and aft outer race 44. Forward outer race 40 may further comprise forward outer raceway 42 on second inner surface 43a while aft outer race 44 may further comprise aft outer raceway 46 on third inner surface 45a. It will be appreciated that although inner race 36 is shown as single part for illustrative purposes, it may comprise more than one part. Alternatively, inner race 36 may be two parts wherein the forward part may comprise forward inner raceway 38 and the aft portion may comprise aft inner raceway 39.

Figure 4:
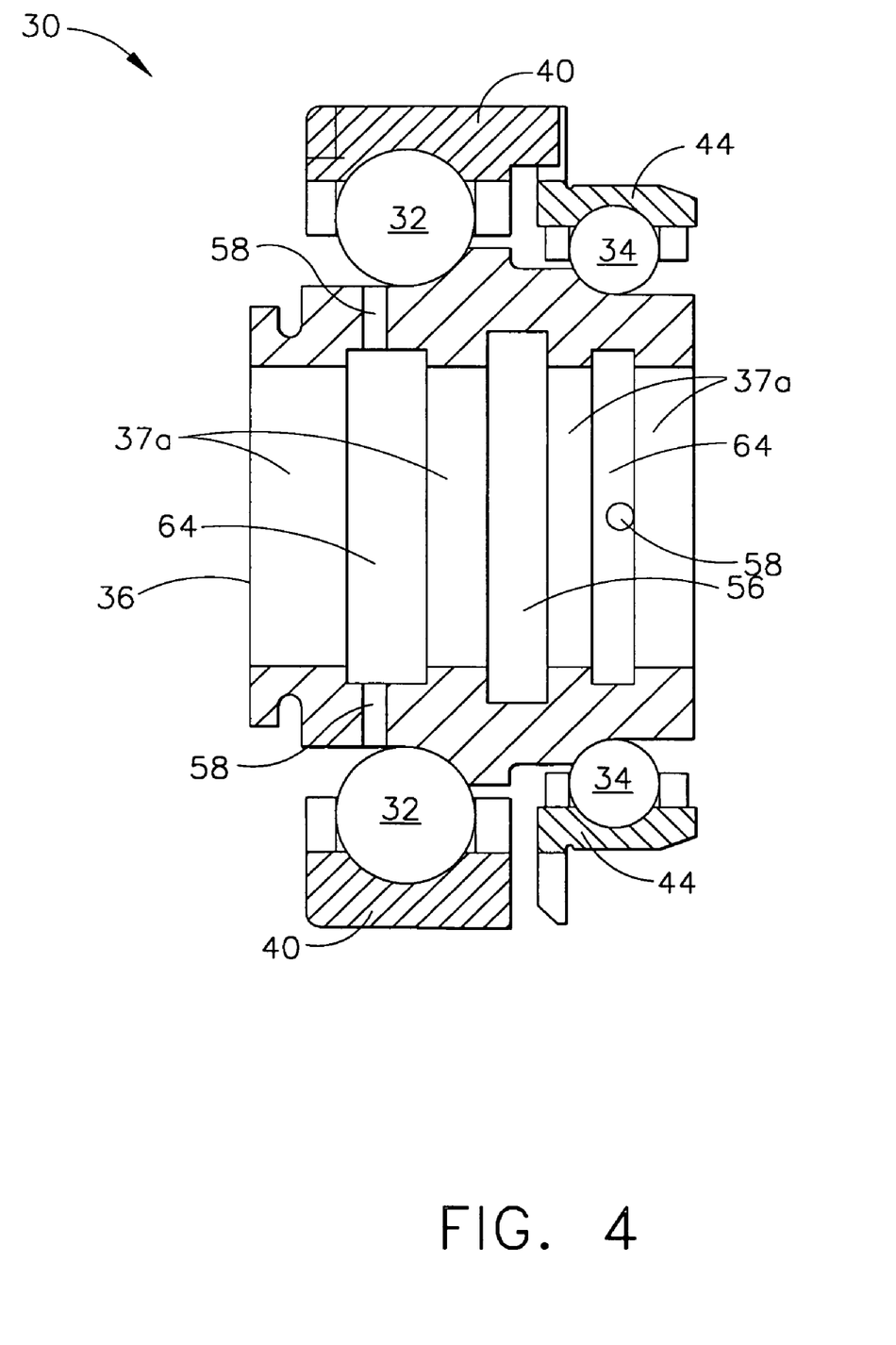
FIG. 4 shows a cross-sectional view of the duplex bearing assembly along the line IV—IV of FIG. 3A, according to one embodiment of the invention.

Inner race 36 may further comprise centrifugal debris trap 56. As illustrated in FIG. 4, centrifugal debris trap 56 may be an annular groove along first inner surface 37a. The groove traps and retains contamination debris that may be found in lubrication fluid before the contamination debris can reach forward 32 and/or aft 34 bearing balls and the raceways. Lubrication fluid may move from shaft 12 to centrifugal debris trap 56 through radial oil supply holes 20 (see FIG. 2). The rotating motion of the shaft may give the lubrication fluid full rotational speed as it enters centrifugal debris trap 56 and this rotational speed may cause contamination debris 62 to be deposited in centrifugal debris trap 56 (see FIG. 7). Full rotational speed may be defined as the speed that produces sufficient radial acceleration required for all or some of contamination debris 62 to be deposited in the centrifugal debris trap 56. For example, the radial acceleration may be, but not limited to, from about 30,000×g to over 70,000×g. In another example, the radial acceleration may be, but not limited to, about 35,000×g to about 50,000×g.

Figure 5:
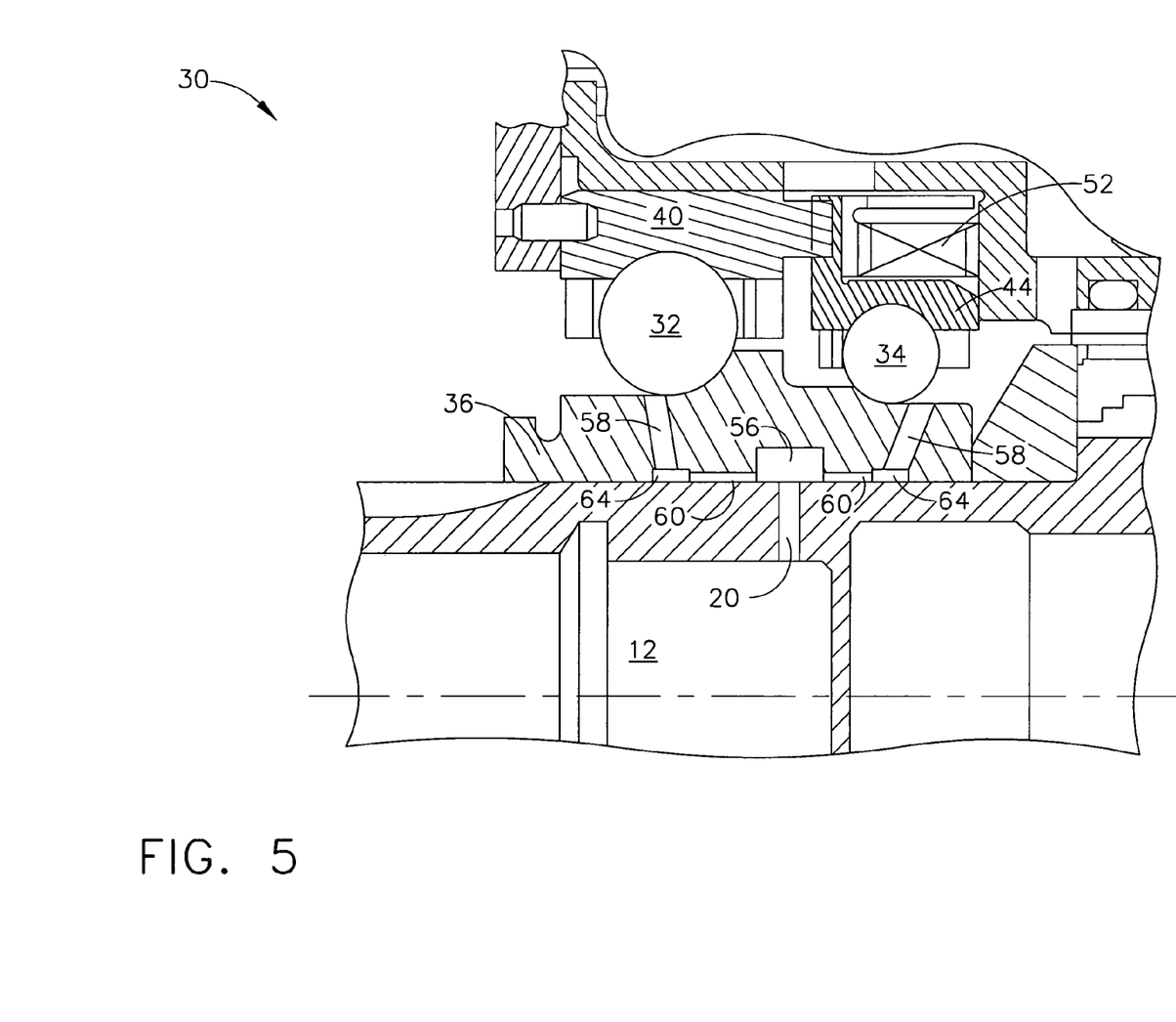
FIG. 5 shows a cross-sectional view of a preloaded duplex ball bearing, according to another embodiment of the present invention.
Figure 6:
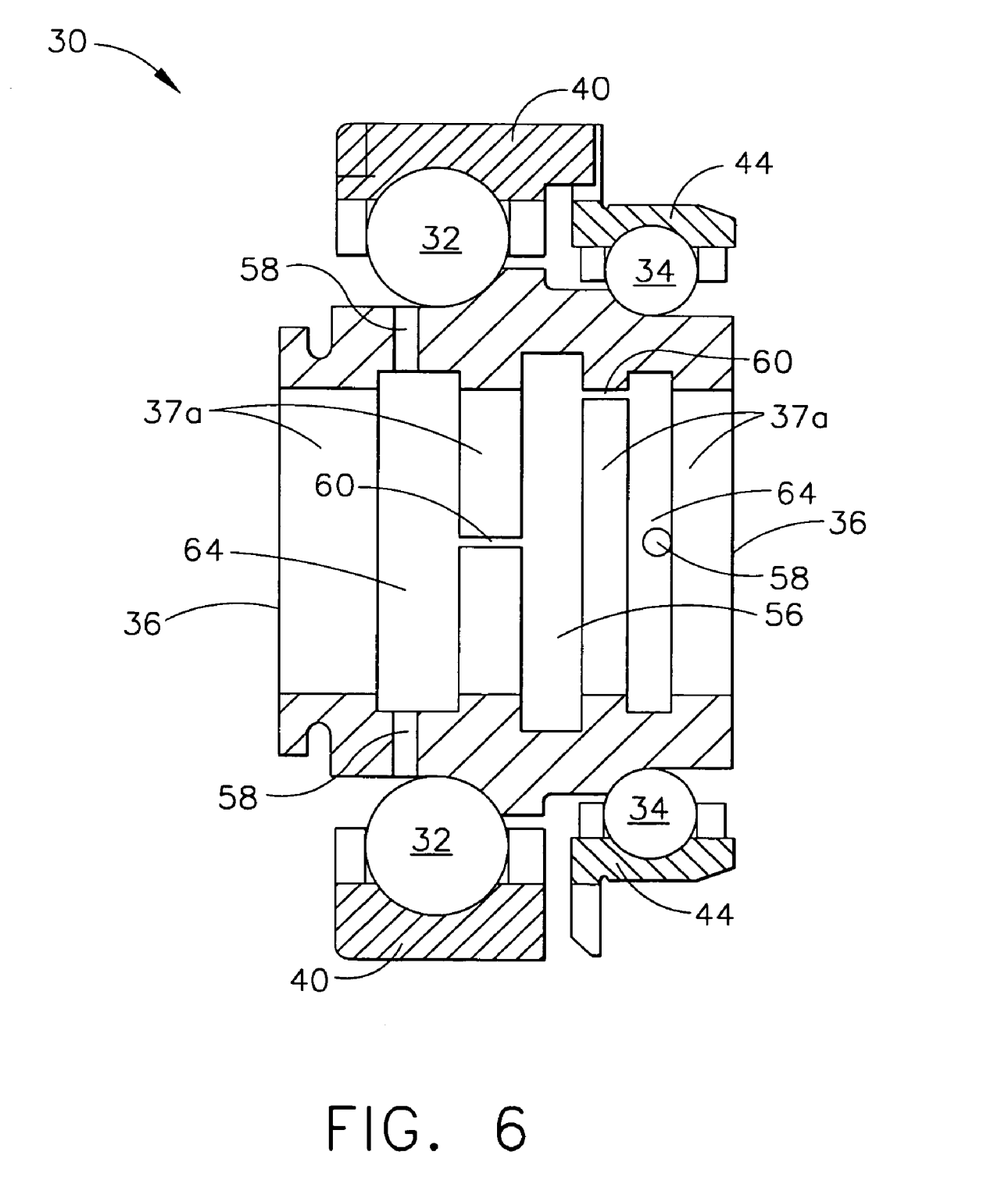
FIG. 6 shows a cross-sectional view of the duplex bearing assembly along the line IV—IV of FIG. 3A, according to another embodiment of the invention.
Figure 7:
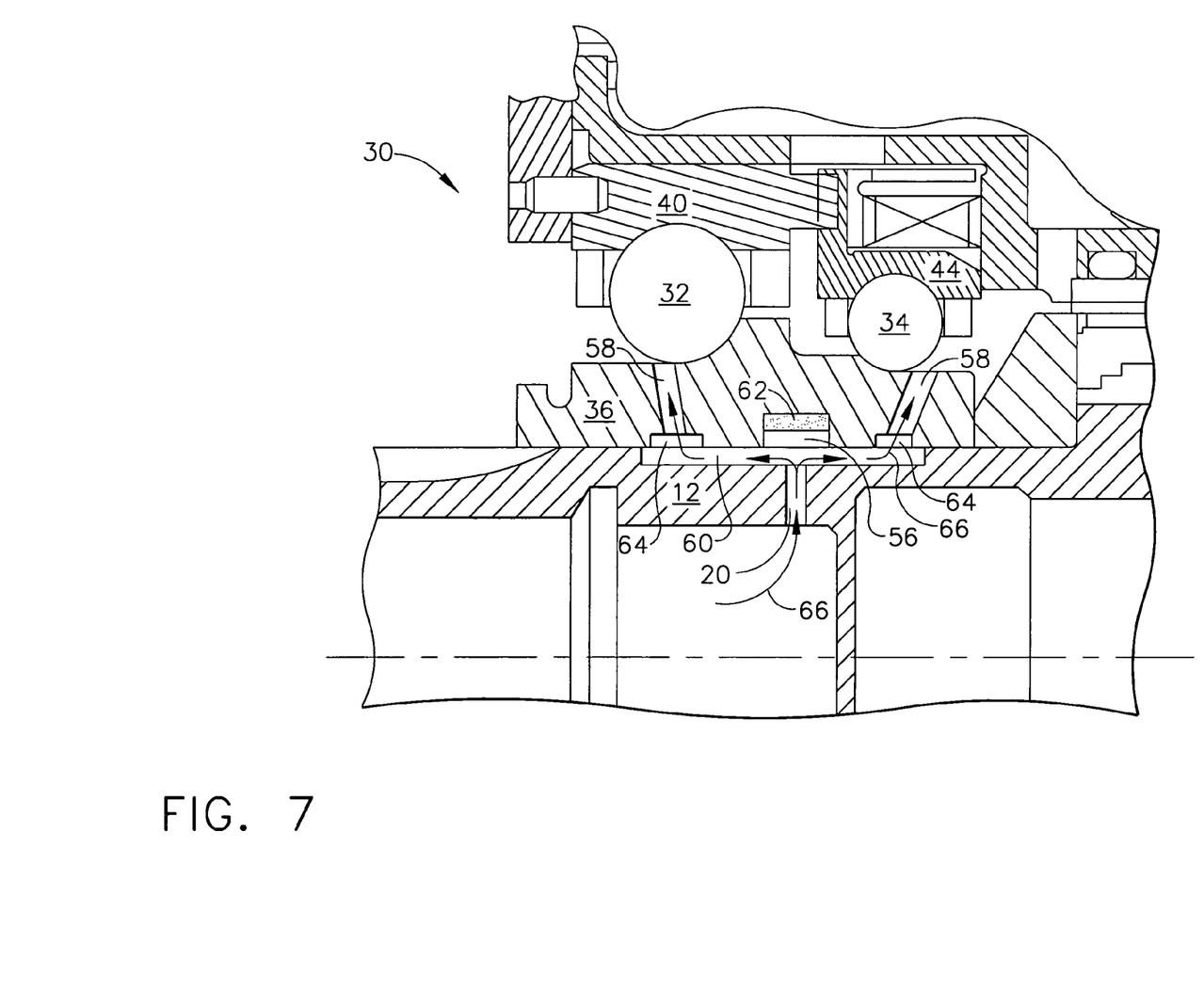
FIG. 7 shows an expanded cross-sectional view of the preloaded duplex bearing of FIG. 2 showing a lubrication fluid flow path, according to one embodiment of the invention.

After contamination debris 62 is removed from the lubrication fluid, the radial acceleration may drive the lubrication fluid from centrifugal debris trap 56 through axial slots 60 to circumferential grooves 64 and then through radial oil holes 58 to forward 32 and aft 34 bearing balls and forward inner raceway 38, aft inner raceway 39, forward outer raceway 42 and/or aft outer raceway 44. The flow path 66 for the lubrication fluid is shown in FIG. 7. Axial slots 60 may be located in main shaft 12 (FIG. 2) or on first inner surface 37a of inner race 36 (FIGS. 5 and 6). The number and distribution of axial slots 60 in main shaft 12 or inner race 36 may vary depending on the dimensions of bearing assembly 30. In one illustrative embodiment, main shaft 12 may have four axial slots where two axial slots connect centrifugal debris trap 56 to radial oil holes 58 for forward bearing ball 32 and two axial slots 60 connect centrifugal debris trap 56 to radial oil holes 58 for aft bearing ball 34. Axial slots 60 located on the same side of inner race 36 with respect to centrifugal debris trap 56 may be offset up to about 180° with respect to each other. Axial slots 60 located on opposite sides of inner race 36 with respect to centrifugal debris trap 56 may be offset by up to about 90° with respect to each other. Offsetting axial slots 60 relative to each other may provide more uniform lubrication fluid distribution. Axial slots 60 may have the same volume. If axial slots 60 on one side of centrifugal debris trap 56 are larger than those on the other side, then the amount of lubrication fluid distributed to the first side will be greater than to the second side with the smaller axial slots 60. Unequal distribution of the lubrication fluid may cause on the ball bearing to be starved for oil, causing failure of bearing assembly 30.

Circumferential grooves 64 may be annular grooves along first inner surface 37 of inner race 36. Circumferential grooves 64 may be located on both sides of centrifugal debris trap 56. Circumferential grooves 64 may be connected to centrifugal debris trap 56 by axial slots 60 (See FIGS. 2, 5 and 6). During engine operation the lubrication fluid is forced from centrifugal debris trap 56 through axial slots 60 and into circumferential grooves 64. From circumferential grooves 64, the lubrication fluid flows through radial oil holes 58 to forward 32 and aft 34 bearing balls and forward inner raceway 38, aft inner raceway 39, forward outer raceway 42 and/or aft outer raceway 44. Radial oil holes 58 to forward ball bearing 32 may be offset up to about 180° with respect to each other. Likewise radial oil holes 58 to aft ball bearing 34 may be offset up to about 180°. Radial oil holes 58 to forward ball bearing 32 may be offset by up to about 90° with respect to radial oil holes 58 to aft ball bearing 34. As with axial slots 60, offsetting radial oil holes 58 relative to each other may provide more uniform lubrication fluid distribution.

Elimination of contamination debris 62 from the lubrication fluid before it reaches the bearing balls 32, 34 and raceways 42, 46 may prevent damage to the balls and/or the raceways caused by the contamination debris particles being trapped between the rolling contact surfaces of forward and aft bearing balls 32, 34 and forward 38 and aft 39 inner raceways and/or forward 42 and aft 46 outer raceways.

The dimensions of the annular groove of centrifugal debris trap 56 may be determined empirically by determining the amount of contamination debris 62 to be removed. Much of this harmful contamination debris may be inside lubrication passages and oil delivery hardware downstream of an oil filter, and may be built into the engine, the contamination debris being released on the first startup on a new production engine, or recently serviced engine. A filter may be set up to catch contamination debris from the lubrication fluid. The width and depth of the annular groove of centrifugal debris trap 56 may be based on the amount of contamination debris 62 that is captured in the filter. The dimensions of the annular groove may be such that over 100% of the expected build contamination debris 62 may be trapped and retained in centrifugal debris trap 56. The annular groove may be any shape that will retain the desired amount of contamination debris. By way of non-limiting example, the groove may be rectangular, trapezoid shape or have a rounded bottom.

Figure 9:
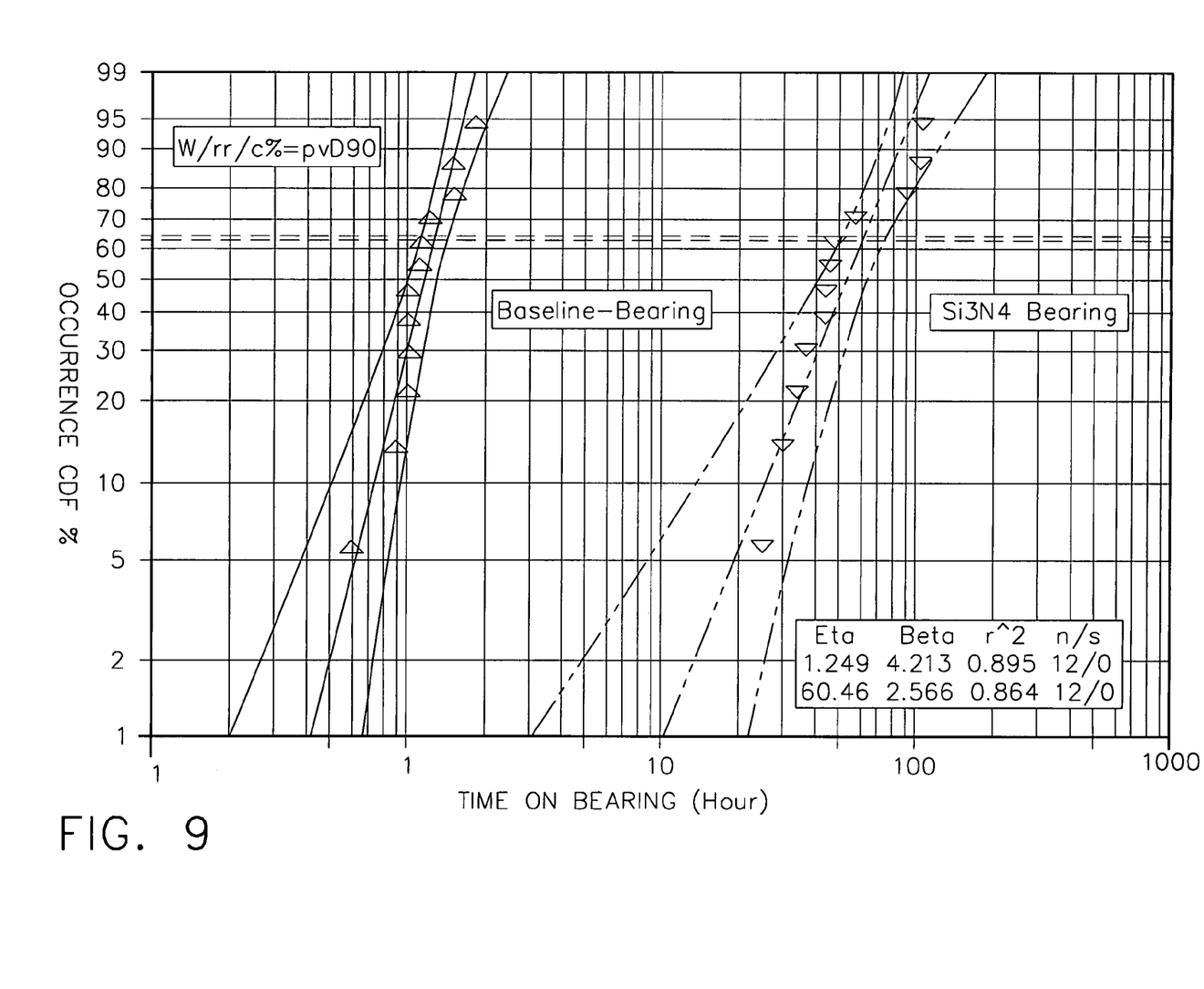
FIG. 9 is a graph illustrating the demonstrated fatigue life improvement under heavily contaminated lubricant conditions with the addition of plasma nitriding of the bearing raceways, according to the invention.

Additional protection against damage from contamination debris 62 may be obtained by increasing the surface hardness of forward 38 and aft 39 inner raceways and/or forward 42 and aft 46 outer raceways. Increasing the surface hardness of the raceways may provide resistance to indent damage from contamination debris 62. An innovative method for increasing the raceway surface hardness of a through-hardened bearing steel, such as, but not limited to AISI M50 or AISI M50NIL steel, the material commonly used for bearing races, is plasma nitriding. The process may be done on through hardened bearing races, with minimal distortion, and may be done below the tempering temperature of the bearing steel. Alternatively, salt bath nitriding may also be used. The resulting finished surface hardness may be from about 850 to 1000 on the Vickers HV.3 scale, as compared to about 700–800 HV.3 for the through-hardened bearing steel. The depth of the plasma nitrided layer may vary, but may be, for example, at least about 0.004 inches deep after final raceway grinding. In addition, the plasma nitriding process may impart desirable compressive residual stress on the raceway surface of over 70 ksi. This compressive residual stress may be desirable for maximizing raceway fatigue life by resisting crack propagation and spalling from any surface damage that occurs. FIG. 9 illustrates the increased lifetime of plasma nitrided raceways (left-hand side) compared to plain through-hardened M50 steel raceways (right-hand side) when operated with heavily contaminated lubricant. The % survival is on the y axis while the time of operation is given on the x axis. There was a 30-fold increase in the L10 life with the plasma nitriding versus the plain through-hardened M50 steel.

Figure 8A:
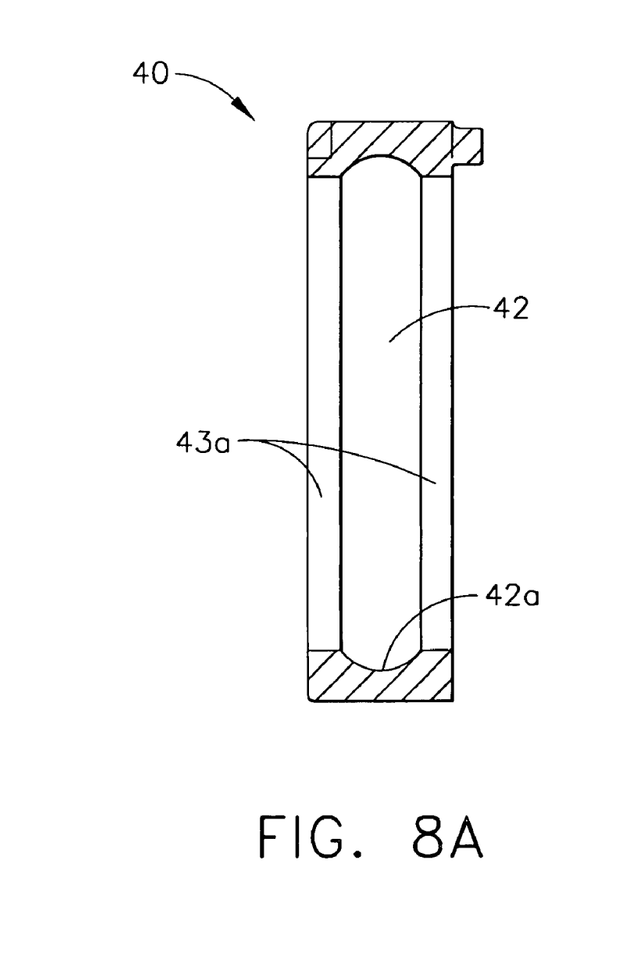
FIG. 8A shows a view of a forward outer raceway of a forward outer race of a duplex bearing assembly, according to the invention.
Figure 8B:
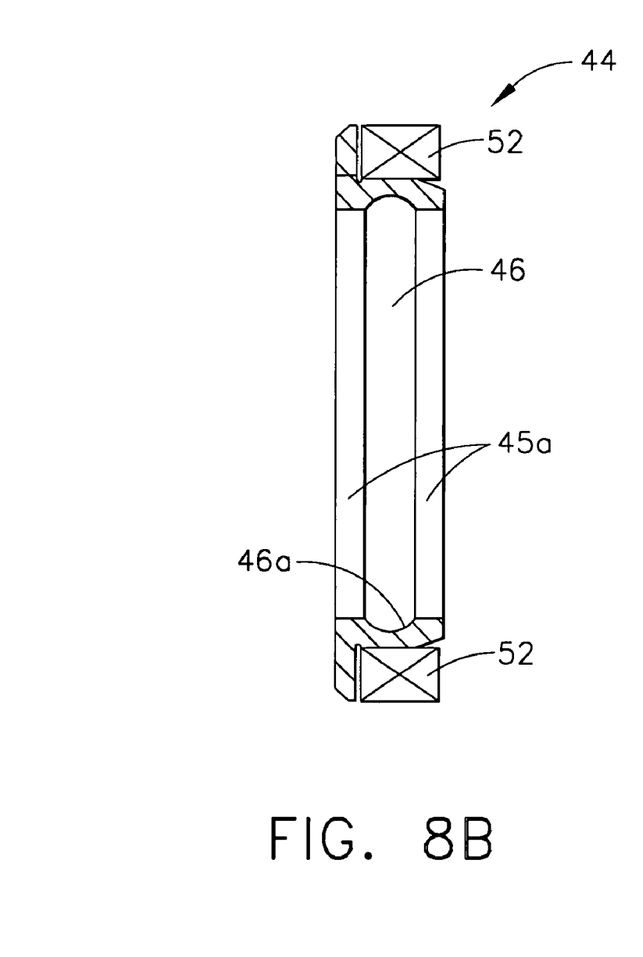
FIG. 8B shows a view of an aft outer raceway of an aft outer race of a duplex bearing assembly, according to the invention.

The forward 32 and aft 34 bearing balls may be made of materials that further reduce damage due to contamination debris. Forward 32 and aft 34 bearing balls may be made of ceramic materials, for example, but not limited to, silicon nitride ($S_3N_4$). Silicon Nitride ceramic bearing balls have a through-hardness of >HRC 75(>1500 HV10), as compared with conventional M50 steel bearing balls having a typical through-hardness of HRC 60–64. Silicon nitride ceramic balls have a density of approximately 40% that of steel balls. This may provide an additional advantage of reduced ball centrifugal force, leading to reduced tendency for ball/raceway skid damage. Silicon nitride balls also may offer the advantage of reduced raceway adhesive wear under marginal lubrication conditions. Alternatively, forward 32 and aft 34 bearing balls may be made of other material with a similar hardness. In addition, forward 32 and aft 34 bearing balls may be made from bearing steels such as AISI M50 and AISI M50NIL with plasma nitriding applied to the surface to increase resistance to contamination debris damage. When selecting material for forward 32 and aft 34 bearing balls, the coefficient of thermal expansion (CTE) of the material may be taken into consideration. As illustrated in FIGS. 8A and 8B, forward 42 and aft 46 outer raceways may have first and second curved surfaces 42a and 46a, respectively, to complement the circumference of forward 32 and aft 34 bearing balls. Forward 42 and aft 46 outer raceways may have first and second radius, respectively, slightly larger than the radius of forward 32 and aft 34 bearing balls such that during operation and rotation of shaft 12, forward 32 and aft 34 bearing balls may contact forward 42a and aft 46a outer raceway surfaces in the desired contact zones to provide acceptable contact stress levels, and operating contact angles. It will be appreciated that although forward 42 and aft 46 outer raceways are used as an example, the same principle may hold true for forward 38 and aft 39 inner raceways. During operation, there may be an increase in temperature of bearing assembly 30 and particularly of forward 32 and aft 34 bearing balls. If the material used for forward 32 and aft 34 bearing balls has too high a coefficient of thermal expansion (CTE), the bearing balls may expand sufficiently to reduce the operating contact angle and increase contact stresses, causing a thermally induced bearing failure. Therefore, the materials used for forward 32 and aft 34 bearing balls may have a CTE from, but not limited to, about 1.0 to about 2.0 ($10^{-6}$ in)/in/° F.

Hard-preloaded duplex bearing assemblies have a high axial stiffness that make them particularly sensitive to damage from contamination debris as well as the thermal gradients usually present during operation of the bearing assemblies. To eliminate the drawbacks associated with hard-preloaded duplex bearing assemblies, duplex bearing assembly 30 of the present invention may comprise a compliant preload spring 52 positioned on third outer surface 45b of aft outer race 44, as illustrated in FIGS. 2 and 8B. Preload spring 52 may be positioned and held in place by spring retainer 54. The use of preload spring 52 may reduce the need for some of the high manufacturing tolerances of bearing assembly 30 components, unlike hard-preloaded bearing assemblies. Preload spring 52 also may provide the opportunity for "roll over" of contamination debris 62 rather than pressing it into the raceways. If contamination debris 62 is present between the bearing balls and respective raceways, the compliance in the spring may allow the bearing balls to "roll over" the debris. With a hard-preloaded bearing assembly, the preload stiffness is comparatively high, and the debris is more readily pressed into the raceways, causing indent damage. Incorporation of preload spring 52 into bearing assembly 30 may also allow bearing assembly 30 to accommodate deflections resulting from thermal gradients with minimal change in preload. Preload spring 52 may be chosen based on the properties of bearing assembly 30. The size of preload spring 52 may be dependent on the space available in bearing assembly 30. Preload spring 52 may be the softest spring available while allowing bearing assembly 30 to maintain adequate minimum preload thrust to prevent slip between balls and raceways, and maintain load on both ball rows during varying thrust conditions including thrust reversals. A typical preload spring may have an axial stiffness value of about 100 lb/in to about 10,000 lb/in, in contrast to a hard preloaded duplex bearing which may have a typical axial stiffness of 500,000 lb/in. By way of non-limiting example, the preload spring of the present invention may have an axial stiffness value of from about 500 lb/in to about 5,000 lb/in. Fatigue life of the bearing may also be considered as well as the ability of bearing assembly 30 to tolerate cold oil starting with enough preload thrust to overcome viscous drag. It will be appreciated by the skilled artisan that, although a duplex bearing assembly has been used as an example of the present invention, the present invention may also be applied to other bearing assemblies requiring lubrication with a lubrication fluid. The concept of the centrifugal debris trap as well as the surface hardened raceways and use of ceramic ball bearings may also be used with a bearing assembly having a single row of bearing balls. Alternatively, the centrifugal debris trap as well as the other embodiments of the present invention may be used with rolling element bearing assemblies where the rolling element is not spherical.

Figure 10:
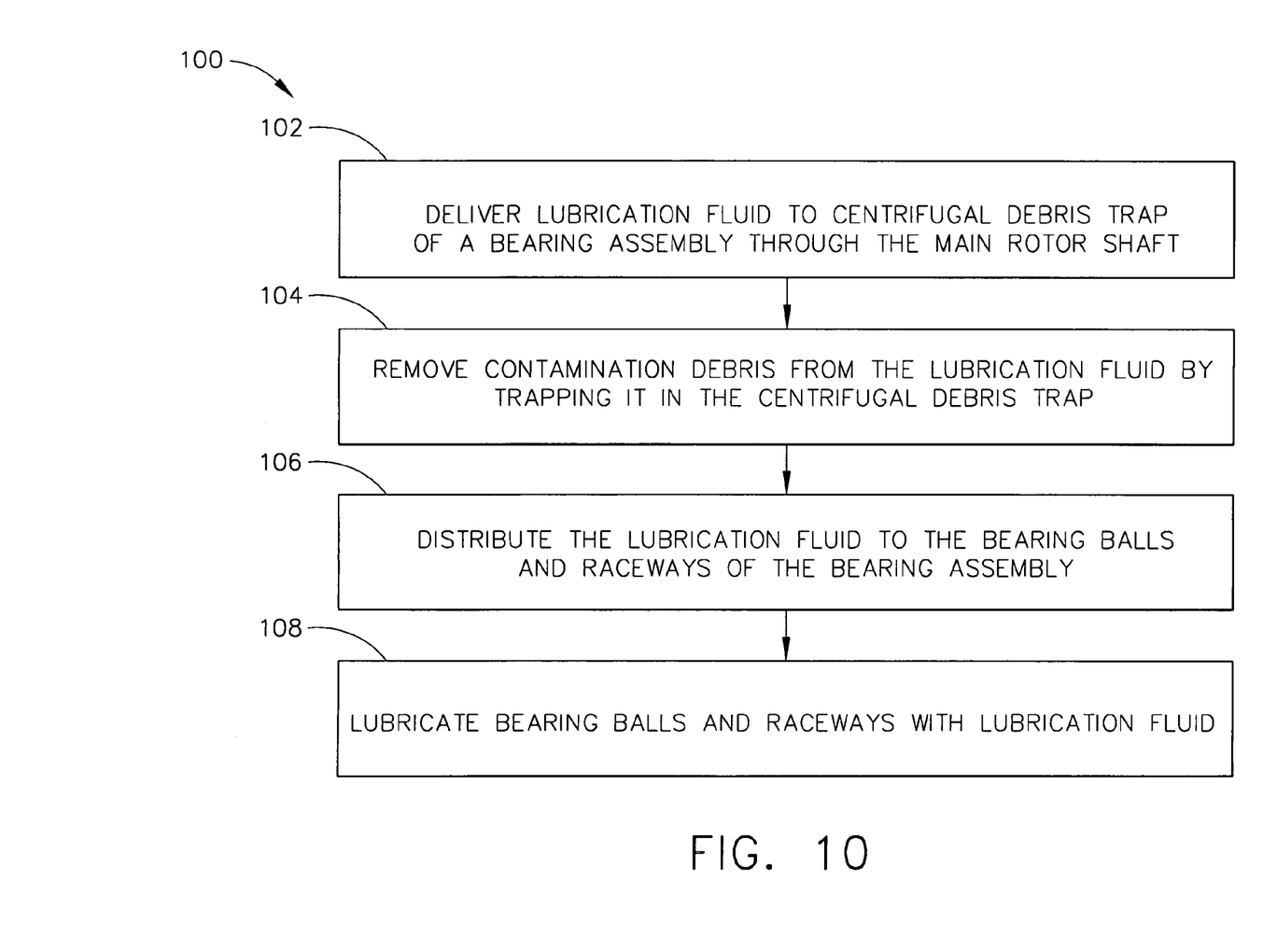
FIG. 10 is a flow chart showing a method of lubricating a bearing assembly, according to the invention.

A method for lubricating a bearing assembly during operation is also provided by the present invention. As shown in FIG. 10, method 100 comprises step 102 of supplying lubricating fluid to a centrifugal debris trap through radial oil supply holes in a main shaft. In step 104, contamination debris found in the lubrication fluid may be trapped and retained in the centrifugal debris trap using centrifugal force. The centrifugal debris trap may comprise an annular groove on a first inner surface of an inner race to retain the contamination debris removed from the lubrication fluid. The lubrication fluid, now free of contamination debris, may be distributed to the raceways and plurality of bearing balls through axial slots, circumferential grooves and radial oil holes in step 106. The lubrication fluid flows from the centrifugal debris trap to the circumferential grooves through the axial slots. The lubrication fluid then flows from the circumferential grooves through the radial oil holes to the plurality of bearing balls. The circumferential grooves may comprise annular grooves on the first inner surface of the inner race where the annular grooves are distributed on both sides of the centrifugal debris trap. The axial slots may be located on the main shaft or on the first inner surface of the inner race and the radial oil holes may be integral to the inner race, fluidly communicating the centrifugal debris trap with the bearing balls. Finally, in step 108, the raceways and bearing balls may be lubricated by the lubrication fluid. The centrifugal force created by the oil moving through a rotating main shaft to a rotating bearing may allow contamination debris to be deposited in the centrifugal debris trap before the lubrication fluid lubricates the raceways and bearing balls. There may be sufficient centrifugal force to trap contamination debris in the annular groove of the centrifugal debris trap. If the centrifugal force is too low, the contamination debris may remain in the lubrication fluid and damage to the bearing assembly may occur, resulting in premature fatigue. The centrifugal force may be great enough to remove over 90% of the contamination debris. The radial acceleration may be, but not limited to, from about 10,000×g to over 70,000×g or alternatively, from about 35,000×g to about 50,000×g.

It should be understood, of course, that the foregoing relates to illustrative embodiments of the invention and that modifications may be made without departing from the spirit and scope of the invention as set forth in the following claims.

We claim:

1. An inner race of a ball bearing assembly wherein the inner race comprises:
   an inner surface and an outer surface;
   a centrifugal debris trap wherein the centrifugal debris trap comprises an annular groove on the inner surface;
   at least one circumferential groove on the inner surface wherein the circumferential groove is in fluid communication with the centrifugal debris trap; and
   radial oil holes fluidly communicating the inner surface and the outer surface.

2. The inner race of claim 1 further comprising at least one axial slot, wherein the circumferential groove is in fluid communication with the centrifugal debris trap through the axial slot.

3. The inner race of claim 1 wherein the inner race is part of bearing assembly.

4. The inner race of claim 3 wherein the bearing assembly is a duplex bearing assembly.

5. The inner race of claim 1 wherein the outer surface of the inner race further comprises an inner raceway.

6. The inner race of claim 5 wherein the inner raceway comprises a hardened surface layer, the hardened surface layer having a minimum finished depth of about 0.004 inches.

7. The inner race of claim 6 wherein the hardened surface layer is applied by plasma nitriding.

8. A bearing assembly comprising:
   a bearing cage;
   a plurality of bearing balls wherein the bearing balls are circumferentially spaced apart from each other by the bearing cage;
   inner and outer races, wherein the bearing cage is disposed between the inner and outer races and wherein the inner race comprises a first inner surface and a first outer surface and the outer race comprises a second inner surface and a second outer surface;
   a centrifugal debris trap wherein the centrifugal debris trap comprises an annular groove on the first inner surface of the inner race;
   at least one circumferential groove on the first inner surface of the inner race wherein the circumferential groove is in fluid communication with the centrifugal debris trap; and
   radial oil holes in the inner race fluidly communicating the circumferential groove with the bearing balls.

9. The bearing assembly of claim 8 further comprising at least one axial slot, wherein the circumferential groove is in fluid communication with the centrifugal debris trap through the axial slot.

10. The bearing assembly of claim 9 comprising at least two axial slots.

11. The bearing assembly of claim 10 wherein the axial slots are offset by up to 180° with respect to each other.

12. The bearing assembly of claim 8 wherein the inner and outer races are concentric and wherein the bearing cage is concentrically disposed between the inner and outer races.

13. The bearing assembly of claim 8 wherein the bearing balls are a ceramic material.

14. The bearing assembly of claim 13 wherein the bearing balls are silicon nitride.

15. The bearing assembly of claim 8 wherein the first outer surface of the inner race further comprises an inner raceway.

16. The bearing assembly of claim 15 wherein the inner raceway comprises a hardened surface layer.

17. The bearing assembly of claim 16 wherein the hardened surface layer has a surface hardness of from about 850 to about 1000 HV.3.

18. The bearing assembly of claim 16 wherein the hardened surface layer is applied by plasma nitriding.

19. The bearing assembly of claim 16 wherein the hardened layer has a minimum finished depth of about 0.004 inches.

20. The bearing assembly of claim 8 wherein the second inner surface of the outer race further comprises an outer raceway.

21. The bearing assembly of claim 20 wherein the outer raceway comprises a hardened surface layer.

22. The bearing assembly of claim 21 wherein the hardened surface layer has a hardness of from about 850 to about 1000 HV.3.

23. The bearing assembly of claim 21 wherein the hardened surface layer is applied by plasma nitriding.

24. The bearing assembly of claim 21 wherein the hardened layer has a minimum finished depth of about 0.004 inches.

25. The bearing assembly of claim 8 further comprising a preload spring wherein the preload spring is disposed on the second outer surface of the outer race.

26. The bearing assembly of claim 25 wherein the preload spring has an axial stiffness value of from about 500 lb/in to about 5,000 lb/in.

27. The bearing assembly of claim 8 wherein the bearing balls are preloaded in the bearing assembly.

28. A duplex bearing assembly comprising:
a forward bearing cage;
a plurality of forward bearing balls wherein the forward bearing balls are circumferentially spaced apart from each other by the forward bearing cage;
an aft bearing cage;
a plurality of aft bearing balls wherein the aft bearing balls are circumferentially spaced apart from each other by the aft bearing cage;
an inner race wherein the inner race comprises a first inner surface and a first outer surface;
a forward outer race and an aft outer race, wherein the forward outer race comprises a second inner surface and a second outer surface and wherein the aft outer race comprises a third inner surface and a third outer surface;
wherein the forward bearing cage is disposed between the inner race and the forward outer race and wherein the aft bearing cage is disposed between the inner race and the aft outer race;
a centrifugal debris trap wherein the centrifugal debris trap comprises an annular groove on the first inner surface of the inner race;
at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap; and
radial oil holes in the inner race fluidly communicating the circumferential grooves with the forward bearing balls and the aft bearing balls.

29. The duplex bearing assembly of claim 28 further comprising a plurality of axial slots, wherein the circumferential grooves are in fluid communication with the centrifugal debris trap through the axial slots.

30. The duplex bearing assembly of claim 28 wherein the inner race further comprises a forward inner raceway and an aft inner raceway on the first outer surface.

31. The duplex bearing assembly of claim 30 wherein the forward outer race further comprises a forward outer raceway on the second inner surface.

32. The duplex bearing assembly of claim 31 wherein the inner race and the forward outer race are concentric and wherein the forward bearing cage is disposed concentrically between the inner race and the forward outer race at the forward inner raceway and the forward outer raceway.

33. The duplex bearing assembly of claim 30 wherein the forward bearing balls and the aft bearing balls are silicon nitride.

34. The duplex bearing assembly of claim 30 wherein the aft outer race further comprises an aft outer raceway on the second inner surface.

35. The duplex bearing assembly of claim 34 wherein the inner race and the aft outer race are concentric and wherein the aft bearing cage is disposed concentrically between the inner race and the aft outer race at the aft inner raceway and the aft outer raceway.

36. The duplex bearing assembly of claim 34 wherein both the forward and aft inner raceways and the forward and aft outer raceways comprises a hardened surface layer.

37. The duplex bearing assembly of claim 36 wherein the hardened surface layer has a hardness of from about 850 to about 1000 HV.3.

38. The duplex bearing assembly of claim 36 wherein the hardened layer has a minimum finished depth of about 0.004 inches.

39. The duplex bearing assembly of claim 28 further comprising a preload spring, the preload spring having an axial stiffness value from about 100 lb/in to about 10,000 lb/in and wherein the preload spring is disposed on the third outer surface of the aft outer race.

40. The duplex bearing assembly of claim 28 wherein the forward bearing balls have a circumference greater than the circumference of the aft bearing balls.

41. A preloaded duplex bearing assembly comprising:
a forward bearing cage;
a plurality of ceramic forward bearing balls wherein the forward bearing balls are circumferentially spaced apart from each other by the forward bearing cage;
an aft bearing cage;
a plurality of ceramic aft bearing balls wherein the aft bearing balls are circumferentially spaced apart from each other by the aft bearing cage;
an inner race wherein the inner race comprises a first inner surface and a first outer surface and wherein the inner race further comprises a forward inner raceway and an aft inner raceway on the first outer surface, the first inner raceway and the second inner raceway further comprising a hardened surface;

a forward outer race and an aft outer race, wherein the forward outer race comprises a second inner surface and a second outer surface, the second inner surface further comprising a forward outer raceway and wherein the aft outer race comprises a third inner surface and a third outer surface, the third inner surface further comprising an aft outer raceway, the forward outer raceway and the aft outer raceway further comprising a hardened surface;

wherein the inner race and the forward outer race are concentric and wherein the forward bearing cage is disposed concentrically between the inner race and the forward outer race at the forward inner raceway and the forward outer raceway;

wherein the inner race and the aft outer race are concentric and wherein the aft bearing cage is disposed concentrically between the inner race and the aft outer race at the aft inner raceway and aft outer raceway;

a centrifugal debris trap wherein the centrifugal debris trap comprises an annular groove on the first inner surface of the inner race;

at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap;

radial oil holes in the inner race fluidly communicating at least one of the circumferential grooves with the forward bearing balls and at least another of the circumferential grooves with the aft bearing balls; and a preload spring disposed on the third outer surface of the aft outer race.

42. The preloaded duplex bearing assembly of claim 41 further comprising a plurality of axial slots, wherein the circumferential grooves are in fluid communication with the centrifugal debris trap through the axial slots.

43. The preloaded duplex bearing assembly of claim 41 wherein the ceramic forward bearing balls and the ceramic aft bearing balls have a coefficient of thermal expansion of from about 1.0 to about 2.0 ($10^{-6}$ in/in/° F.).

44. The preloaded duplex bearing assembly of claim 41 wherein the finished hardened layer is greater than or equal to 0.004 inches and is applied by plasma nitriding.

45. The preloaded duplex bearing assembly of claim 41 further comprising a spring retainer wherein the preload spring is disposed between the spring retainer and the third outer surface of the aft outer race.

46. The preloaded duplex bearing assembly of claim 41 wherein the preload spring has an axial stiffness value of from about 500 lb/in to about 5,000 lb/in.

47. A turbine engine comprising:
a main shaft;
an bearing carrier; and
a duplex bearing assembly comprising a forward bearing cage, a plurality of forward bearing balls wherein the forward bearing balls are circumferentially spaced apart from each other by the forward bearing cage, an aft bearing cage, a plurality of aft bearing balls wherein the aft bearing balls are circumferentially spaced apart from each other by the aft bearing cage, an inner race wherein the inner race comprises a first inner surface and a first outer surface, a forward outer race and an aft outer race, wherein the forward outer race comprises a second inner surface and a second outer surface and wherein the aft outer race comprises a third inner surface and a third outer surface, wherein the forward bearing cage is disposed between the inner race and the forward outer race and wherein the aft bearing cage is disposed between the inner race and the aft outer race, a centrifugal debris trap wherein the centrifugal debris trap comprises an annular groove on the first inner surface of the inner race, at least two circumferential grooves on the first inner surface of the inner race wherein at least one circumferential groove is on one side of the centrifugal debris trap and at least one circumferential groove is on the other side of the centrifugal debris trap and wherein the circumferential grooves are in fluid communication with the centrifugal debris trap, and radial oil holes in the inner race fluidly communicating at least one of the circumferential grooves with the forward bearing balls and at least another of the circumferential grooves with the aft bearing balls; and wherein the duplex bearing assembly is connected to the main shaft at the first inner surface of the inner race and wherein the duplex bearing assembly is connected to the bearing carrier at the second and third outer surfaces of the forward and aft outer races.

48. The turbine engine of claim 47 wherein the duplex bearing assembly further comprises a plurality of axial slots on the first inner surface of the inner race, wherein the circumferential grooves are in fluid communication with the centrifugal debris trap through the axial slots.

49. The turbine engine of claim 48 wherein the duplex bearing assembly comprises two circumferential grooves and four axial slots, wherein two axial slots fluidly communicate the centrifugal debris trap to each circumferential groove.

50. The turbine engine of claim 47 wherein the main shaft further comprises a plurality of axial slots, wherein the circumferential grooves are in fluid communication with the centrifugal debris trap through the axial slots.

51. The turbine engine of claim 50 wherein the duplex bearing assembly comprises two circumferential grooves and the main shaft comprises four axial slots, wherein two axial slots fluidly communicate the centrifugal debris trap to each circumferential groove.

52. The turbine engine of claim 47 wherein the turbine engine is a high-speed gas turbine engine.

53. The turbine engine of claim 47 wherein the duplex bearing assembly further comprises a preload spring wherein the preload spring is disposed on the third outer surface of the aft outer race.

54. The turbine engine of claim 53 wherein the preload spring has an axial stiffness value of from about 500 lb/in to about 5,000 lb/in.

55. The turbine engine of claim 47 wherein the main shaft further comprises radial oil supply holes.

56. A method of lubricating a bearing assembly comprising the steps of:
delivering lubrication fluid to a centrifugal debris trap through radial oil supply holes in a main shaft;
trapping contamination debris in the lubrication fluid in the centrifugal debris trap using centrifugal force, wherein the centrifugal debris trap comprises an annular groove on a first inner surface of an inner race;

distributing the lubrication fluid to a plurality of bearing balls through axial slots to circumferential grooves and then to radial oil holes, wherein the circumferential grooves are annular grooves on the first inner surface of the inner race and the radial oil holes are in the inner race; and lubricating the raceways and bearing balls with the lubrication fluid.

57. The method of claim 56 wherein the centrifugal force is from about 35,000×g to about 50,000×g.

58. The method of claim 56 wherein an inner raceway and an outer raceway are also lubricated.

59. The method of claim 56 wherein the bearing assembly is a preloaded duplex bearing assembly.

60. The method of claim 56 wherein the lubrication fluid is an oil.

* * * * *

UNITED STATES PATENT AND TRADEMARK OFFICE
CERTIFICATE OF CORRECTION

PATENT NO. : 7,178,987 B2
APPLICATION NO. : 11/034028
DATED : February 20, 2007
INVENTOR(S) : Bridges et al.

It is certified that error appears in the above-identified patent and that said Letters Patent is hereby corrected as shown below:

Column 11, line 34, "hardened layer" should be changed to --hardened surface layer--;
Column 13, line 57, "an" should be changed to --a--.
Column 13, line 44, "F.)." should be changed to --F).--.

Signed and Sealed this

Seventeenth Day of July, 2007

JON W. DUDAS
*Director of the United States Patent and Trademark Office*